(12) United States Patent
Leon Lara (10) Patent No.: US 12,301,106 B2
(45) Date of Patent: May 13, 2025

(54) RESONANT CONVERTER WITH RECONFIGURABLE RESONANT

(71) Applicant: ABL IP Holding LLC, Atlanta, GA (US)

(72) Inventor: Luis Manuel Leon Lara, Wilmington, MA (US)

(73) Assignee: ABL IP Holding LLC, Atlanta, GA (US)

( * ) Notice: Subject to any disclaimer, the term of this patent is extended or adjusted under 35 U.S.C. 154(b) by 234 days.

(21) Appl. No.: 17/928,104

(22) PCT Filed: Jun. 1, 2021

(86) PCT No.: PCT/US2021/035206
§ 371 (c)(1),
(2) Date: Nov. 28, 2022

(87) PCT Pub. No.: WO2021/243331
PCT Pub. Date: Dec. 2, 2021

(65) Prior Publication Data
US 2023/0246545 A1 Aug. 3, 2023

Related U.S. Application Data

(60) Provisional application No. 63/032,468, filed on May 29, 2020.

(51) Int. Cl.
*H02M 3/335* (2006.01)
*H02M 1/00* (2006.01)
*H02M 1/08* (2006.01)
*H02M 1/44* (2007.01)
*H02M 3/00* (2006.01)

(52) U.S. Cl.
CPC ......... *H02M 3/015* (2021.05); *H02M 1/0054* (2021.05); *H02M 1/08* (2013.01); *H02M 1/44* (2013.01); *H02M 3/33523* (2013.01)

(58) Field of Classification Search
CPC ........ H02M 1/0054; H02M 1/08; H02M 1/44; H02M 3/01; H02M 3/015; H02M 3/335; H02M 3/33523
See application file for complete search history.

(56) References Cited

U.S. PATENT DOCUMENTS 5,991,171 A * 11/1999 Cheng ............... H02M 3/33507
363/97
9,077,255 B2 7/2015 Fu et al.
(Continued)

OTHER PUBLICATIONS

PCT/US2021/035206, "International Preliminary Report on Patentability," mailed Dec. 8, 2022 (9 pages).
(Continued)

*Primary Examiner* — Gary L Laxton
(74) *Attorney, Agent, or Firm* — Kilpatrick Townsend & Stockton LLP (57) ABSTRACT

A resonant tank converter including a reconfigurable resonant tank circuit including a switch configured to switch a resonant tank configuration of the reconfigurable resonant tank circuit to a first or second configuration in response to feedback signals representative of the output to a load. In some embodiments, the first configuration is an LLC resonant tank configuration, and the second configuration is an LCC resonant tank configuration.

17 Claims, 3 Drawing Sheets

(56) References Cited

U.S. PATENT DOCUMENTS

| | | | |
|---|---|---|---|
| 11,637,451 B2* | 4/2023 | Nakao | H02J 50/12 |
| | | | 307/104 |
| 2006/0006815 A1 | 1/2006 | Alexandrov | |
| 2008/0298093 A1 | 12/2008 | Jin et al. | |
| 2011/0157926 A1 | 6/2011 | Adragna | |
| 2013/0063981 A1 | 3/2013 | Dujic et al. | |
| 2015/0124487 A1* | 5/2015 | Fu | H02M 3/015 |
| | | | 363/17 |
| 2015/0124490 A1* | 5/2015 | Sanuki | H02M 3/01 |
| | | | 363/17 |
| 2018/0219419 A1* | 8/2018 | Ettes | H04B 5/266 |
| 2018/0324936 A1 | 11/2018 | Olmos et al. | |
| 2020/0007044 A1* | 1/2020 | Sato | H02M 1/36 |

OTHER PUBLICATIONS

CA3185463, "Office Action", May 6, 2024, 3 pages.
PCT/US2021/035206, "International Search Report and the Written Opinion," mailed Sep. 14, 2021, 9 pages.

* cited by examiner

RESONANT CONVERTER WITH RECONFIGURABLE RESONANT

CROSS-REFERENCE TO RELATED APPLICATIONS

The present application is an international application of, and claims priority to, U.S. Provisional Application No. 63/032,468, filed, May 29, 2020, the entire teachings of which are hereby incorporated herein by reference.

TECHNICAL FIELD

The present application relates to a voltage converter circuit, and more particularly, to a resonant converter with a reconfigurable resonant tank circuit.

BACKGROUND

A resonant converter is a is a known type of a switching converter used in circuits for driving loads such as solid-state light sources (e.g., light emitting diode (LED)-based light sources) and/or for establishing a low power direct current (DC) supply for primary and/or secondary circuits, e.g., microcontrollers, application specific integrated circuits (ASICS). Compared to other switched mode converters, e.g., flyback converters, resonant tank converters can operate at a relatively high efficiency, while generating low electromagnetic interference (EMI) due to low switching noise.

Resonant converters contain a network of at least one inductor and at least one capacitor called a "resonant tank." The resonant tank is tuned to resonate at a specific frequency. A variety of different resonant tank configurations are known, including, for example, a series connected inductor and capacitor configuration (referred to as a "series LC" configuration), a parallel inductor and capacitor configuration (referred to as a "parallel LC" configuration), a configuration with two inductors and a capacitor (referred to as an "LLC" configuration), a configuration with an inductor and two capacitors (referred to as an "LCC" configuration), etc. Different resonant tank circuits can provide different operating characteristics.

In a resonant converter a switching circuit may be used to drive the resonant tank with an AC input, e.g., a square wave input, having a controllable switching frequency. The resonant tank provides an alternating current (AC) output in response to the output of the switching circuit. In some known configurations, the AC output of the resonant tank may be coupled to transformer, rectified, and then stabilized to provide a DC output to the load. The DC output voltage or the output current of the resonant converter may be modified by variation of the switching frequency, allowing effective regulation of the output voltage or current in relation to the load and input voltage characteristics.

SUMMARY

Though resonant converters can provide significant advantages, the configuration of the resonant tank configuration used in the resonant converter should be chosen based on the load and output current/voltage requirements. For example, an LLC resonant tank configuration may be used at a reasonable switching frequency to drive a relatively high resistance load at a relatively high current. However, when a relatively low current is required, or a relatively low resistance load is driven by the circuit, it may be necessary to drive the LLC resonant tank circuit at a high switching frequency of for example, five times the resonant frequency of the resonant tank configuration or more. At high switching frequencies, switching losses and flux losses in a transformer can become unreasonable. An LLC resonant tank configuration may thus be best suited for driving a fixed load, e.g., a fixed number of LED strings, or for a high voltage or current output, but may not be suitable for driving a relatively low resistance load or driving a load at a relatively low current or voltage.

In situations where low current or voltage is required, or a relatively low resistance load is to be driven, an LCC resonant tank configuration may be preferable. An LCC resonant tank configuration can provide a low current and/or drive a relatively low resistance load using lower switching frequency, e.g., three times the resonant frequency of the resonant tank configuration or lower, compared to an LLC resonant tank configuration. The lower switching frequencies can avoid switching losses and EMI. An LCC circuit, however, may not drive a relatively high resistance load or provide a high output current as efficiently as an LLC resonant tank configuration. An LCC resonant tank configuration may thus be best suited for a wide-ranging load, e.g., a range of LED strings, or loads at different or low output current and/or voltage.

To address the different operating characteristics of different resonant tank configurations, embodiments are disclosed that include a resonant converter with a reconfigurable resonant tank circuit that provides high efficiency when driving a fixed or relatively high resistance load and also provides wide range operation at relatively low resistance loads. In general, the voltage and/or current characteristics of the load are sensed and provided as feedback to a controller. The controller may be configured, e.g., programed, to control a switch of the reconfigurable resonant tank circuit. When a first voltage and/or current characteristic of the load is sensed, the switch may be placed in first state to place the reconfigurable resonant tank circuit in first resonant tank configuration. When a second voltage and/or current characteristic of the load is sensed, the switch may be placed in second state to place the reconfigurable resonant tank circuit in second resonant tank configuration.

In some embodiments, for example, the reconfigurable resonant tank circuit may be configured to switch between an LLC resonant tank configuration and an LCC resonant tank configuration depending on the state of the switch. When the current and/or voltage characteristics indicates the load is a high load or being driven at a high current or voltage, the controller may place the switch in a state to configure the reconfigurable resonant tank circuit in an LLC resonant tank configuration. When the current and/or voltage characteristics indicates the load is a relatively low resistance load or being driven at a low current or voltage, the controller may place the switch in a state to configure the reconfigurable resonant tank circuit in an LCC resonant tank configuration. Embodiments disclosed herein are particularly useful, for example, when driving solid-state light sources, e.g., LEDs, when the number of solid-state light sources in the load may vary or when using a dimming circuit that reduces the output current to the solid-state light sources to provide dimming of the light output from the light sources.

According to one aspect of the disclosure there is provided a resonant tank converter for providing a direct current (DC) output to a load. The resonant tank converter includes: a switching circuit configured to receive a DC input and provide an alternating current (AC) output; a reconfigurable resonant tank circuit coupled to the AC output of the switching circuit, the reconfigurable resonant tank circuit comprising a switch having a first state and a second state, wherein when the switch is in the first state, the reconfigurable resonant tank circuit has a first resonant tank configuration and when the switch is in the second state the reconfigurable resonant tank circuit has a second resonant tank configuration; a feedback circuit configured to be coupled to the load and configured to provide feedback representative of the DC output to the load; and a controller circuit coupled to the reconfigurable resonant tank circuit and configured to place the switch in the first state or the second state in response to the feedback.

In some embodiments, the first resonant tank configuration is an LLC resonant tank configuration, and the second resonant tank configuration is an LCC resonant tank configuration. In some embodiments, the reconfigurable resonant tank circuit includes capacitor coupled in series with the switch. In some embodiments, the switch is a metal oxide field effect transistor (MOSFET). In some embodiments, the resonant tank converter further includes a transformer having a primary winding and a secondary winding, wherein the primary winding of the transformer forms an inductance portion of the reconfigurable resonant tank circuit. In some embodiments, the resonant tank converter further includes an output rectifier circuit coupled to the secondary winding of the transformer and a low pass filter circuit coupled to the output rectifier circuit. In some embodiments, the controller circuit includes a secondary controller configured to receive the feedback from the feedback circuit, an optocoupler, and a primary controller configured to receive an output of the secondary controller through the optocoupler, wherein the primary controller is configured to provide a configuration control output to the switch to place the switch in the first state or the second state in response to the feedback. In some embodiments, the controller circuit is configured to provide a switching control output to the switching circuit to control a frequency of the AC output. In some embodiments, the controller circuit is configured to provide a switching control output to the switching circuit to control a frequency of the AC output to be 120 kHz or less in both the first resonant tank configuration and the second resonant tank configuration. In some embodiments, the controller circuit is configured to place the switch in the first state or the second state when the DC output voltage or an output current crosses a pre-determined threshold.

According to another aspect of the disclosure there is provided a resonant tank converter for providing a direct current (DC) output to a load. The resonant tank converter includes: a switching circuit configured to receive a DC input and provide an alternating current (AC) output; a reconfigurable resonant tank circuit coupled to the AC output of the switching circuit, the reconfigurable resonant tank circuit comprising a capacitor coupled in series with a metal oxide field effect transistor (MOSFET) switch having a first state and a second state, wherein when the MOSFET switch is in the first state, the reconfigurable resonant tank circuit has an LLC resonant tank configuration and when the switch is in the second state the reconfigurable resonant tank circuit has an LCC resonant tank configuration; a transformer having a primary winding and a secondary winding, wherein the primary winding of the transformer forms an inductance portion of the reconfigurable resonant tank circuit; an output rectifier circuit coupled to the secondary winding of the transformer for rectifying an output at the secondary winding and providing a rectified output; a low pass filter circuit coupled to the output rectifier circuit for receiving the rectified output and providing the DC output to the load; a feedback circuit configured to be coupled to the load and configured to provide feedback representative of the DC output; and a controller circuit coupled to the reconfigurable resonant tank circuit and configured to place the switch in the first state or the second state in response to the feedback.

In some embodiments, the controller circuit includes a secondary controller configured to receive the feedback from the feedback circuit, an optocoupler, and a primary controller configured to receive an output of the secondary controller through the optocoupler, wherein the primary controller is configured to provide a configuration control output to the switch to place the switch in the first state or the second state in response to the feedback. In some embodiments, the controller circuit is configured to provide a switching control output to the switching circuit to control a frequency of the AC output. In some embodiments, the controller circuit is configured to provide a switching control output to the switching circuit to control a frequency of the AC output to be 120 kHz or less in both the first resonant tank configuration and the second resonant tank configuration.

According to another aspect of the disclosure, there is provided method of driving a load using a resonant converter. The method includes: providing feedback representative of a DC output to the load; and controlling a switch of a reconfigurable resonant tank circuit of the resonant converter to place the switch in a first state or a second state in response to the feedback, wherein when the switch is in the first state the reconfigurable resonant tank circuit has a first resonant tank configuration and when the switch is in the second state the reconfigurable resonant tank circuit has a second resonant tank configuration.

In some embodiments of the method, the first resonant tank configuration is an LLC resonant tank configuration, and the second resonant tank configuration is an LCC resonant tank configuration. In some embodiments, the reconfigurable resonant tank circuit comprises a capacitor coupled in series with the switch. In some embodiments, the switch is a metal oxide field effect transistor (MOSFET). In some embodiments, the method further includes controlling a frequency of an AC output signal coupled to the reconfigurable resonant tank circuit to be 120 kHz or less in both the first resonant tank configuration and the second resonant tank configuration. In some embodiments, the controlling comprises switching the switch to the first state or the second state when the DC output voltage or an output current crosses a pre-determined threshold.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
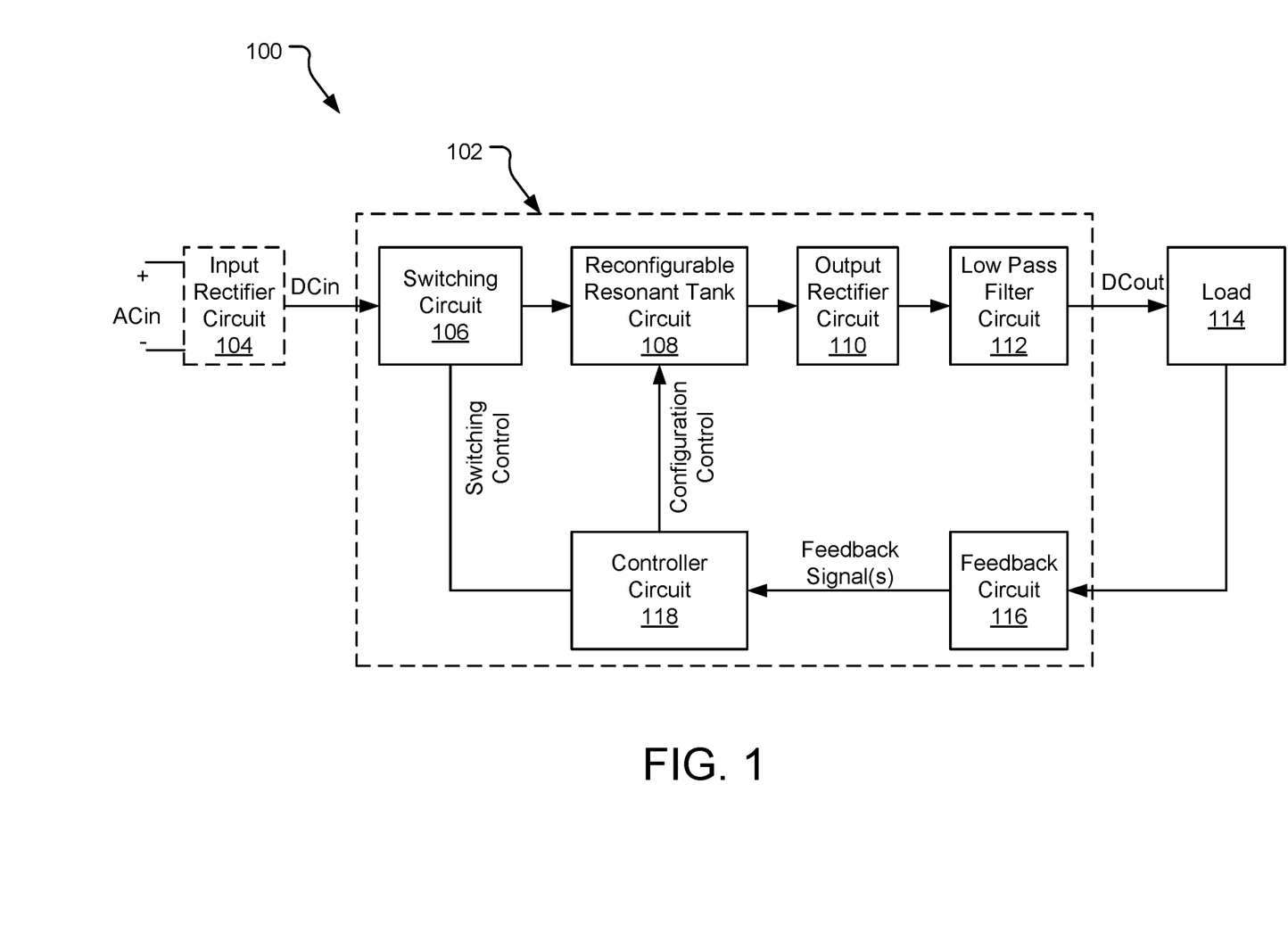
FIG. 1 is a schematic diagram of one example embodiment of a system consistent with the present disclosure.

FIG. 1 is a schematic diagram of one example embodiment 100 of a system consistent with the present disclosure.

In general, the system includes a resonant converter 102 consistent with the present disclosure for receiving either an alternating current (AC) input $AC_{in}$, directly or through a known dimmer circuit, or a direct current (DC) input $DC_{in}$, and providing a regulated DC output $DC_{out}$ for driving a load 114. The load 114 may be one or more solid state light sources, including, but not limited to, groups of LEDs interconnected in series and/or parallel configurations, a power supply input for primary or secondary microcontrollers or application specific integrated circuits (ASICS), and other loads requiring a stable DC input.

In embodiments configured to receive an AC input, the AC input $AC_{in}$ may be provided directly from a 120 VAC/60 Hz line source or from other AC sources, such as a 220-240 VAC at 50-60 Hz, a 12 VAC source, etc. In general, the AC input voltage $AC_{in}$ is coupled to an optional input rectifier circuit 104, either directly or through a dimmer circuit. The input rectifier circuit 104 may be configured to rectify the AC input $AC_{in}$ to provide a DC input $DC_{in}$ to the resonant converter 102. A variety of rectifier circuit configurations are well-known in the art. In some embodiments, for example, the input rectifier circuit 104 may include a known diode bridge rectifier or a known field effect transistor (FET) bridge rectifier. Alternatively, a system 100 consistent with the present disclosure may operate from a DC source that provides the DC input $DC_{in}$ directly to the resonant converter circuit 102.

In the illustrated example embodiment, the resonant converter 102 includes a switching circuit 106, a reconfigurable resonant tank circuit 108, an output rectifier circuit 110, a low pass filter circuit 112, a feedback circuit 116 and a controller circuit 118. In general, the resonant tank converter 102 provides resonant tank converter functionality using a resonant tank configuration of the reconfigurable resonant tank circuit 108. The controller circuit 118 places the reconfigurable resonant tank circuit 108 into a resonant tank configuration that depends on the feedback output of the feedback circuit 116.

The switching circuit 106 operates to receive the DC input voltage $DC_{in}$ and, in response to a switching control output from the control circuit 118, provide an AC output, e.g., a square wave output, to the reconfigurable resonant tank circuit 108. The switching circuit 106 may take a known switching circuit configuration used in known resonant tank converters. In some embodiments, for example, the switching circuit 108 may include two transistors, e.g., MOSFETs, in a half-bridge configuration or four transistors in a full bridge configuration. A switching control output of the controller circuit 118 may be coupled to the transistors, e.g., to the gates of the MOSFETs, to control the conducting state of the transistors to provide the AC output to the reconfigurable resonant tank circuit 108.

The reconfigurable resonant tank circuit 108 may be configured to take different resonant tank configurations in response to different configuration control outputs from the controller circuit 118. In some embodiments for example, the reconfigurable resonant tank circuit 108 may include one or more inductors, one or more capacitors and one or more switches having first and second states, e.g., an open state where current does not flow through the switch and a closed state wherein current does flow through the switch. One of the inductors in the reconfigurable resonant tank circuit 108 may be a primary winding of an isolation transformer configured to provide galvanic isolation between a primary winding side of the resonant converter 102 and a secondary winding side of the resonant converter 102. The switch(es) are coupled in the reconfigurable resonant tank circuit 108 so that when one or more of the switch(es) are the first state, the reconfigurable resonant tank circuit 108 has a first resonant tank configuration, e.g., an LLC resonant tank configuration, and when one or more of the switch(es) are in the second state the reconfigurable resonant tank circuit 108 has a second resonant tank configuration, e.g., and LCC resonant tank configuration.

The feedback circuit 116 is configured to be coupled to the load 114 and configured to provide feedback signal(s) representative of the DC output voltage $DC_{out}$ to the load 114. For example, the feedback circuit 116 may take a known configuration for providing one or more feedback signals to the controller circuit 118 representative of the voltage across the load 114 and/or the current through the load 114. In some embodiments, the feedback circuit 116 may include series connected resistors to provide a voltage divider across the load 114 and may sense a voltage of the voltage divider circuit to provide an output to the controller circuit 118 representative of the voltage across the load 114. In addition, or alternatively, the feedback circuit 116 may include one or more resistors coupled in series with the load 114 to provide an output representative of the current through the load 114.

The controller circuit 118 may be a known controller for use with resonant tank circuits. The controller circuit 118 is coupled to the feedback circuit 116 and to the reconfigurable resonant tank circuit 108 and is configured to place the switch(es) of the reconfigurable resonant tank circuit 108 in the first state or the second state in response to the feedback signals(s) from the feedback circuit 116 to thereby place the reconfigurable resonant tank circuit 108 in the first or second resonant tank configuration. In a known manner, the controller circuit 118 may also provide switching control signal(s) to the switching circuit 106 to control the switching frequency of the switching circuit 106 and the frequency of the output of the switching circuit 106. In some embodiments, the switching frequency may be controlled by the controller circuit 118 to be 120 kHz or less in both the first and second resonant tank configurations to drive the load 114 at an efficiency of 80% or more.

The controller circuit 118 may be programmed to provide configuration control signals to the reconfigurable resonant tank circuit 108 in response to the feedback signals. For example, the controller circuit 118 may be programed to place one or more of the switch(es) of the reconfigurable resonant tank circuit 108 in first state to place the reconfigurable resonant tank circuit 108 in first resonant tank configuration when the feedback signal(s) indicate the DC output voltage $DC_{out}$ has a first voltage and/or current characteristic. The controller circuit 118 may be programed to place one or more of the switch(es) of the reconfigurable resonant tank circuit 108 in second state to place the reconfigurable resonant tank circuit 108 in second resonant tank configuration when the feedback signal(s) indicate the DC output voltage $DC_{out}$ has a second voltage and/or current characteristic. In some embodiments, the controller circuit 118 may be programed to switch the reconfigurable resonant tank circuit 108 between the first and second resonant tank configurations when the output voltage $DC_{out}$ or output current crosses a pre-determined threshold voltage.

In some embodiments, for example, the reconfigurable resonant tank circuit 108 may be configured to switch between an LLC resonant tank configuration and an LLC resonant tank configuration depending on the state of the switch of the reconfigurable resonant tank circuit 108. The controller circuit 118 may be programed to place one or more of the switch(es) of the reconfigurable resonant tank circuit 108 in a first state to place the reconfigurable resonant tank circuit 108 in an LLC resonant tank configuration when the feedback signal(s) indicate the load 114 is a high load or being driven at a high current or voltage. The controller circuit 118 may be programed to place one or more of the switch(es) of the reconfigurable resonant tank circuit 108 in second state to place the reconfigurable resonant tank circuit in an LCC resonant tank configuration when the feedback signal(s) indicate the load 114 is a relatively low resistance load or being driven at a low current or voltage, e.g., to achieve dimming of a load 114 including solid-state light sources.

The AC output of the reconfigurable resonant tank circuit 108 may be coupled to the output rectifier circuit 110. In some embodiments, the AC output of the reconfigurable resonant tank circuit 108 may be inductively coupled to the output rectifier circuit 110 by a transformer having a primary winding and forming an inductive component of the reconfigurable resonant tank circuit 108 and a secondary winding coupled to the output rectifier circuit 110. The transformer may provide galvanic isolation that is required in some applications.

The output rectifier circuit 110 may take a known configuration. In some embodiments, for example, the output rectifier circuit 110 may include a known diode bridge rectifier or a known field effect transistor (FET) bridge rectifier. The low pass filter circuit 112 may be a known low pass filter circuit commonly used in resonant converter configurations. In some embodiments, for example, the low pass filter circuit 112 may include one or more capacitors coupled in parallel with the output rectifier circuit 110 and the load 114.

Figure 2:
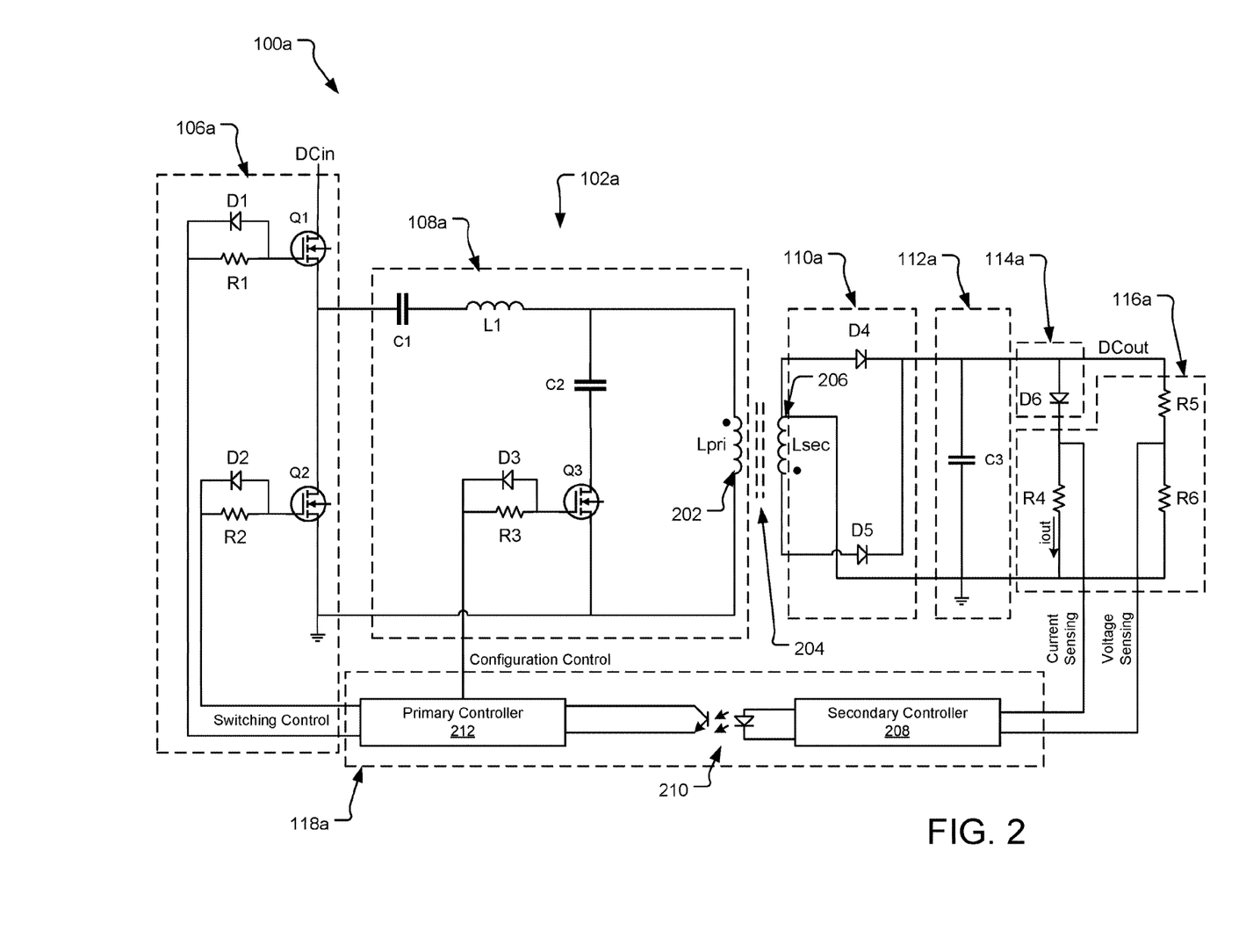
FIG. 2 is a schematic diagram of another example embodiment of a system consistent with the present disclosure.

A resonant converter 102 consistent with the present disclosure may be provided in a variety of configurations. One example embodiment 100a of system and a resonant converter 102a with the present disclosure is shown in FIG. 2. As described in connection with the embodiment shown in FIG. 1, the resonant converter 102a receives an input voltage $DC_{in}$, either directly or from the output of an AC rectifier circuit 106 (FIG. 1) and provides a regulated DC output voltage $DC_{out}$ for driving a load 114a. In the illustrated example embodiment 100a, for simplicity and ease of explanation, the load 114a is illustrated as a single LED D5. It is to be understood, however, that the load 114a may include any number of solid-state light sources, e.g., LEDs, configured in a parallel and or series configurations, and that a resonant converter 102a consistent with the present disclosure may be used to drive loads 114a other than solid-state light sources.

The resonant converter 102a includes a switching circuit 106a, a reconfigurable resonant tank circuit 108a, an output rectifier circuit 110a, a low pass filter circuit 112a, a feedback circuit 116a and a controller circuit 118a. In the illustrated example embodiment, the switching circuit 106a includes a first MOSFET Q1 and a second MOSFET Q2 in a known half-bridge configuration. The drain of the MOSFET Q1 is coupled to the DC input voltage $DC_{in}$ and the source of the MOSFET Q1 is coupled to the drain of the MOSFET Q2 and the reconfigurable resonant tank circuit 108a. The source of the MOSFET Q2 is coupled to ground. The gate of the MOSFET Q1 is coupled to a switching control output signal of the controller circuit 118a through a parallel combination of a reverse biased diode D1 and a resistor R1 to limit the gate voltage at Q1. The gate of the MOSFET Q2 is coupled to a switching control output signal of the controller circuit 118a through a parallel combination of a reverse biased diode D2 and a resistor R2 to limit the gate voltage at Q2. The controller circuit 118a provides the switching control signals to the MOSFETs Q1 and Q2 in a known manner to cycle the conducting states of the MOSFETs to generate a square wave output to the reconfigurable resonant tank circuit 108a. As is known, the DC output voltage $DC_{out}$ and the output current $i_{out}$ can be controlled in a stable, regulated manner by modifying the frequency of switching of the MOSFETs Q1 and Q2 by the controller circuit 118a.

Figure 3:
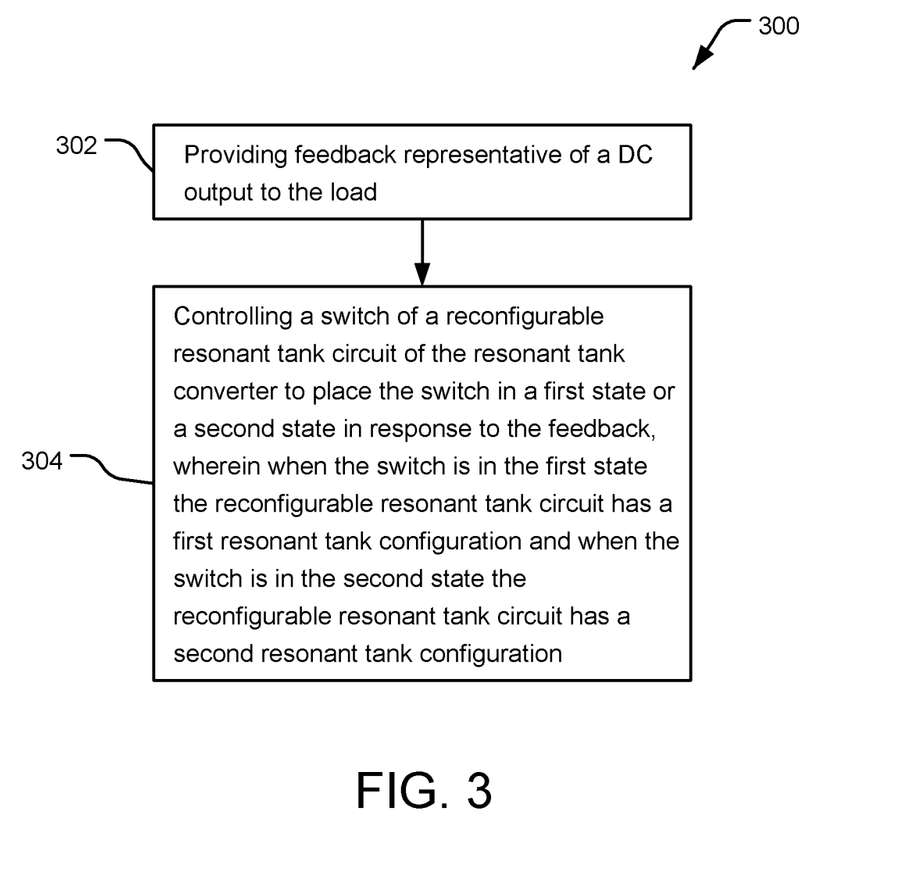
FIG. 3 is a flowchart illustrating one method consistent with the present disclosure.

In the illustrated example embodiment, the reconfigurable resonant tank circuit 108a a includes a first capacitor C1, an inductor L1, a second capacitor C2, a MOSFET Q3, a diode D3, a resistor R3 and an inductance $L_{pri}$ established by the primary winding 202 of a transformer 204. The transformer 204 also includes a secondary winding 206 having an inductance $L_{sec}$. The negative terminals of the primary winding 202 and the secondary winding 206 are coupled to ground. In a known manner, the transformer 204 provides galvanic isolation between the primary 206 and secondary 206 windings and the components coupled thereto. Those of ordinary skill in the art will recognize the transformer 204 may be provided in a variety of configurations, e.g., with a single secondary winding 206, as shown in FIG. 3, with a secondary winding have a center tap to ground, etc.

The output rectifier circuit 110a is coupled to the secondary winding 206 of the transformer 204 for rectifying the output at the secondary winding 206 and providing a rectified output to the low pass filter circuit 112a. A variety of known rectifier configurations may be used for the output rectifier circuit 110a. The output rectifier circuit 110a may, for example, have a known half-bridge or full bridge rectifier configuration.

In the illustrated example embodiment, the output rectifier circuit 110a has a known half-bridge rectifier configuration including diodes D4 and D5. A first terminal of the diode D4 is coupled the negative terminal of the secondary winding 206, which is coupled to ground. A first terminal of the diode D5 is coupled to the positive terminal of the secondary winding 206. The second terminals of the diodes D4 and D5 are connected to each other and provide an output to the low pass filter circuit 112a. In the illustrated example embodiment, the low pass filer circuit 112a is coupled to the output rectifier circuit 110a and includes a capacitor C3. The capacitor C3 is provided in a known configuration in between the output of the rectifier circuit 110a and ground to provide the DC output voltage $DC_{out}$ to the load LED D6.

With reference again to the reconfigurable resonant tank circuit 108a, the capacitor C1 is coupled to the output of the switching circuit 106a and in series with the inductor L1. The inductor L1 is coupled to C2 and to the positive terminal of the primary winding 202 of the transformer 204. The primary winding 202 has an inductance $L_{pri}$. C2 is coupled to the drain of Q3. The source of Q3 is coupled to ground. The gate of the MOSFET Q3 is coupled to a configuration control output signal of the controller circuit 118a through a parallel combination of a reverse biased diode D3 and a resistor R3 to limit the gate voltage at Q3.

The MOSFET Q3 acts as a switch in the illustrated embodiment 100a. When the MOSFET Q3 is not conducting, the MOSFET Q3 is in an "open" state and the reconfigurable resonant tank circuit 108a has an LLC resonant tank configuration that resonates between capacitor C1, the inductor L1 and the inductance $L_{pri}$ of the primary winding 202 of the transformer 204. The resonant tank configuration of the reconfigurable resonant tank circuit 108a can be reconfigured from the LLC resonant tank configuration by placing the MOSFET Q3 in a conducting state. When the MOSFET Q3 is conducting, the MOSFET Q3 is in an "closed" state and the reconfigurable resonant tank circuit 108a has an LCC resonant tank configuration that resonates between the capacitor C1, the inductor L1 and the capacitor C2. The conducting state of the MOSFET Q3 is controlled by the configuration control output of the controller circuit 118a in response to feedback from the feedback circuit 116a. An advantage of using the MOSFET Q3 in the illustrated configuration 100a is that a body diode of the MOSFET Q3 allows resetting of the voltage of the capacitor C2 when it is reversed biased, while allowing the reconfigurable resonant converter circuit 108a to resonate with the inductance $L_{pri}$ of the primary winding 202.

In the illustrated example embodiment, the feedback circuit 116a includes a resistors R4, R5 and R6. Resistor R4 is coupled in series with the load 114a, i.e., LED D6. A first output of the feedback circuit 116a is a current sensing feedback signal taken between the LED D6 and resistor R4 and is representative of the output current $i_{out}$ through the load LED D6. The resistors R5 and R6 are coupled in series across the series combination of the LED D6 and the resistor R4 to form voltage divider. A second output of the feedback circuit 116a is a voltage sensing feedback signal taken between R5 and R6 and is representative of the output voltage $DC_{out}$ across the series combination of the load LED D6 and the resistor R4 and is thus representative of the voltage across the load LED D6.

The current sensing and voltage sensing feedback signals from the feedback circuit 116a are coupled to the controller circuit 118a. In the illustrated example embodiment, the controller circuit 118a includes a secondary controller 208, an optocoupler 210 and a primary controller 212. The secondary 208 and primary 212 controllers may be known, and commercially available, controllers used in resonant converter circuit configurations and the optocoupler 210 may be a known and commercially available optocoupler configuration. The secondary controller 208 is coupled to receive the current sensing and voltage sensing feedback signals to from the feedback circuit 116a. The secondary controller 208 may be programed to provide a first output signal to the optocoupler 210 when the feedback signals indicate the output voltage $DC_{out}$ and/or output current $i_{out}$ have a first characteristic indicating the load LED D6 is a relatively high resistance load LED D6 and/or operating a high output voltage $DC_{out}$ and/or current $i_{out}$. The secondary controller 208 may be programed to provide a second output signal to the optocoupler 210 when the feedback signals indicate the output voltage $DC_{out}$ and/or output current $i_{out}$ have a second characteristic indicating the load LED D6 is a relatively low resistance load LED D6 and/or operating a low output voltage $DC_{out}$ and/or current $i_{out}$.

The optocoupler 210 maintains galvanic isolation between components of the system 100a coupled to the primary winding 202 and components of the system 100a coupled to the secondary winding 206. In a known manner, the optocoupler 210 converts the output signals from the secondary controller 208 to a light output at the secondary winding 206 side of the transformer 204 and then converts the light output back to an electrical signal on the primary winding 202 side of the transformer 204. The output of the optocoupler 210 is provided as an input to the primary controller 212 and is representative of the output of the secondary controller 208.

The primary controller 212 receives the output of the secondary controller 208 through the optocoupler 210 and may be programmed to provide the configuration control output to the gate of MOSFET Q3 through the parallel combination of the resistor R3 and the diode D3 in response to the output of the secondary controller 208. For example, when the secondary controller 208 provides an output indicating the load LED D6 is a relatively high resistance load LED D6 and/or operating a high output voltage $DC_{out}$ and/or output current $i_{out}$, the primary controller 212 may be configured to provide a configuration control output that places the MOSFET Q3 in a non-conducting, i.e., open, state. In this state, there is no current flow to the capacitor C2 and the reconfigurable resonant tank circuit 108a has an LLC resonant tank configuration for driving the relatively high resistance load LED D6 and/or driving at a high output voltage $DC_{out}$ or output current $i_{out}$. When the secondary controller 208 provides an output indicating the load LED D6 is a relatively low resistance load LED D6 and/or operating a low output voltage $DC_{out}$ and/or low output current $i_{out}$, the primary controller 212 may be configured to provide a configuration control output that places the MOSFET Q3 in a conducting, i.e., closed, state. In this state, current flows to the capacitor C2 and the reconfigurable resonant tank circuit 108a has an LCC resonant tank configuration for driving the low resistance load LED D6 and/or driving at a low output voltage $DC_{out}$ or low output current $i_{out}$.

A system 100, 100a consistent with the present disclosure, thus includes a reconfigurable resonant tank circuit 108, 108a having a resonant tank configuration that dynamically varies depending on the load and/or output conditions. In some embodiments of a system 100, 100a consistent with the present disclosure, the reconfigurable resonant tank circuit 108, 108a may have a resonant tank configuration that dynamically varies between an LLC resonant tank configuration and an LCC resonant tank configuration depending on the load and/or output conditions. In some embodiments, this can ensure the switching frequency, i.e., the frequency of the square wave output of the switching circuit 106, 106a required to drive the reconfigurable resonant tank circuit 108, 108a, is maintained at 120 kilohertz (kHz) or less in both the LLC resonant tank configuration and the LCC resonant tank configuration to drive the load in either the LLC or LCC resonant tank configuration at an efficiency 80% or more, while avoiding switching losses.

Table 1 below shows calculated efficiency of one example of a system 100a consistent with the present disclosure for 120 VAC and 277 VAC input voltages and driving a load at an output current of 1500 milliamps (mA) with different output voltages $DC_{out}$. Table 1 shows data in the columns labeled "LLC OFF State" for when the MOSFET Q3 is in an off or open state and the reconfigurable resonant tank circuit 108a is in an LLC resonant tank configuration and data in the columns labeled "LCC ON State" for when the MOSFET Q3 is an in on or closed state and the reconfigurable resonant tank circuit 108a is in an LCC resonant tank configuration. The columns identified as "LLC-LCC" show, for each input voltage and output voltage, the resonant tank circuit 108a resonant tank configuration chosen in one embodiment for balancing efficiency and switching losses.

TABLE 1

| | % Efficiency at 120 Vac input | | | | % Efficiency at 277Vac input | | | |
| --- | --- | --- | --- | --- | --- | --- | --- | --- |
| | | | I_out | | | | | |
| DC_out | 1500 mA_ LLC OFF State | 1500 mA_ LCC ON State | 1500 mA_ LLC-LCC | | 1500 mA_ LLC OFF State | 1500 mA_ LCC ON State | 1500 mA_ LLC-LCC | |
| 20 | 83.09 | 81.63 | 81.63 | LCC | 83 | 81.58 | 81.58 | LCC |
| 22 | 84.14 | 82.48 | 82.48 | type | 84.08 | 82.55 | 82.55 | type |
| 24 | 85.05 | 83.14 | 83.14 | | 85.15 | 83.41 | 83.41 | |
| 26 | 85.8 | 83.68 | 83.68 | | 86 | 84.13 | 84.13 | |
| 28 | 86.45 | 84.12 | 84.12 | | 86.76 | 84.73 | 84.73 | |
| 30 | 86.99 | 84.46 | 84.46 | | 87.46 | 85.21 | 85.21 | |
| 32 | 87.48 | 84.73 | 84.73 | | 88.05 | 85.59 | 85.59 | |
| 34 | 87.89 | 84.96 | 84.96 | | 88.58 | 85.92 | 85.92 | |
| 36 | 88.26 | 85.13 | 88.26 | LLC | 89.09 | 86.21 | 89.09 | LLC |
| 38 | 88.56 | 85.28 | 88.56 | type | 89.51 | 86.45 | 89.51 | type |
| 40 | 88.81 | 85.47 | 88.81 | | 89.85 | 86.73 | 89.85 | |
| 42 | 89.04 | 85.73 | 89.04 | | 90.19 | 87.03 | 90.19 | |
| 44 | 89.24 | 86 | 89.24 | | 90.47 | 87.39 | 90.47 | |
| 46 | 89.42 | 86.19 | 89.42 | | 90.75 | 87.67 | 90.75 | |
| 48 | 89.62 | 86.33 | 89.62 | | 91.14 | 87.91 | 91.14 | |
| 50 | 89.72 | 86.46 | 89.72 | | 91.26 | 88.12 | 91.26 | |
| 52 | 89.85 | 86.55 | 89.85 | | 91.48 | 88.29 | 91.48 | |

As shown, for the input voltages of 120 VAC and 277 VAC and an output current of 1500 mA, the controller 118a may be programmed to place the MOSFET Q3 in a conducting state to place the reconfigurable resonant tank circuit 108a in an LCC resonant tank configuration for output voltages between 20 VDC and 34 VDC. For output voltages between 36 VDC and 52 VDC, the controller 118a may be programed to place the MOSFET Q3 in a non-conducting state to place the reconfigurable resonant tank circuit 108a in an LLC resonant tank configuration.

FIG. 3 is a flowchart illustrating one example of a method 300 consistent with the present disclosure consistent with the present disclosure. The illustrated flow chart may be shown and described as including a particular sequence of steps. It is to be understood, however, that the sequence of steps merely provides an example of how the general functionality described herein can be implemented. The steps do not have to be executed in the order presented unless otherwise indicated. FIG. 3 illustrates a method 300 of driving a load using a resonant converter. The method includes: monitoring 302 feedback representative of a DC output to the load; and controlling 304 a switch of a reconfigurable resonant tank circuit of the resonant converter to place the switch in a first state or a second state in response to the feedback, wherein when the switch is in the first state the reconfigurable resonant tank circuit has a first resonant tank configuration and when the switch is in the second state the reconfigurable resonant tank circuit has a second resonant tank configuration. As described above, in some embodiments, the first resonant tank configuration may be an LLC resonant tank configuration and the second resonant tank configuration may be an LCC resonant tank configuration.

The methods and systems described herein are not limited to a particular hardware or software configuration and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors and may be stored on one or more storage medium readable by the processor (including volatile and non-volatile memory and/or storage elements), one or more input devices, and/or one or more output devices. The processor thus may access one or more input devices to obtain input data and may access one or more output devices to communicate output data. The input and/or output devices may include one or more of the following: Random Access Memory (RAM), Redundant Array of Independent Disks (RAID), floppy drive, CD, DVD, Blu-Ray, magnetic disk, internal hard drive, external hard drive, memory stick, flash drive, solid state memory device, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices. The device(s) or computer systems that integrate with the processor(s) may include, for example, a personal computer(s), workstation(s), handheld device(s) such as cellular telephone(s) or smartphone(s) or tablet(s), laptop(s), laptop/tablet hybrid(s), handheld computer(s), smart watch(es), or any other device(s) capable of being integrated with a processor(s) that may operate as provided herein. Accordingly, the devices provided herein are not exhaustive and are provided for illustration and not limitation.

References to a "controller", a "microcontroller", "a microprocessor" and "a processor", or "the controller", "the microcontroller", "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "controller", a "microcontroller", "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

As used in any embodiment herein, a "circuit" or "circuitry" may comprise hardware or software, or a combination of hardware and software, for example, singly or in any combination, hardwired circuitry, programmable circuitry, state machine circuitry, and/or firmware that stores instructions executed by programmable circuitry. In at least one embodiment, the controller circuit 118, 118a may comprise one or more integrated circuits. An "integrated circuit" may be a digital, analog, or mixed-signal semiconductor device and/or microelectronic device, such as, for example, but not limited to, a semiconductor integrated circuit chip.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A resonant tank converter for providing a direct current (DC) output voltage to a load, the resonant tank converter comprising:
    a switching circuit configured to receive a DC input voltage and provide an alternating current (AC) output voltage;
    a reconfigurable resonant tank circuit coupled to the AC output voltage of the switching circuit, the reconfigurable resonant tank circuit comprising a switch having a first state and a second state, wherein when the switch is in the first state, the reconfigurable resonant tank circuit has a first resonant tank configuration and when the switch is in the second state the reconfigurable resonant tank circuit has a second resonant tank configuration;
    a feedback circuit configured to be coupled to the load and configured to provide feedback representative of the DC output voltage to the load; and
    a controller circuit coupled to the reconfigurable resonant tank circuit and configured to place the switch in the first state or the second state in response to the feedback,
    wherein the controller circuit is configured to provide a switching control output to the switching circuit to control a frequency of the AC output voltage to be 120 kHz or less in both the first resonant tank configuration and the second resonant tank configuration.

2. The resonant tank converter according to claim 1, wherein the first resonant tank configuration is an LLC resonant tank configuration, and the second resonant tank configuration is an LCC resonant tank configuration.

3. The resonant tank converter according to claim 1, wherein the reconfigurable resonant tank circuit comprises a capacitor coupled in series with the switch.

4. The resonant tank converter according to claim 1, wherein the switch is a metal oxide field effect transistor (MOSFET).

5. The resonant tank converter according to claim 1, wherein the resonant tank converter further comprises a transformer having a primary winding and a secondary winding, wherein the primary winding of the transformer forms an inductance portion of the reconfigurable resonant tank circuit.

6. The resonant tank converter according to claim 1, wherein the resonant tank converter further comprises an output rectifier circuit coupled to a secondary winding of a transformer and a low pass filter circuit coupled to the output rectifier circuit.

7. The resonant tank converter according to claim 1, wherein the controller circuit comprises a secondary controller configured to receive the feedback from the feedback circuit, an optocoupler, and a primary controller configured to receive an output of the secondary controller through the optocoupler, and wherein the primary controller is configured to provide a configuration control output to the switch to place the switch in the first state or the second state in response to the feedback.

8. The resonant tank converter according to claim 1, wherein the controller circuit is configured to provide a switching control output to the switching circuit to control a frequency of the AC output voltage.

9. The resonant tank converter according to claim 1, wherein the controller circuit is configured to place the switch in the first state or the second state when the DC output voltage or an output current crosses a pre-determined threshold.

10. A resonant tank converter for providing a direct current (DC) output voltage to a load, the resonant tank converter comprising:
   a switching circuit configured to receive a DC input and provide an alternating current (AC) output voltage;
   a reconfigurable resonant tank circuit coupled to the AC output voltage of the switching circuit, the reconfigurable resonant tank circuit comprising a capacitor coupled in series with a metal oxide field effect transistor (MOSFET) switch having a first state and a second state, wherein when the MOSFET switch is in the first state, the reconfigurable resonant tank circuit has an LLC resonant tank configuration and when the switch is in the second state the reconfigurable resonant tank circuit has an LCC resonant tank configuration;
   a transformer having a primary winding and a secondary winding, wherein the primary winding of the transformer forms an inductance portion of the reconfigurable resonant tank circuit;
   an output rectifier circuit coupled to the secondary winding of the transformer for rectifying an output at the secondary winding and providing a rectified output;
   a low pass filter circuit coupled to the output rectifier circuit for receiving the rectified output and providing the DC output voltage to the load;
   a feedback circuit configured to be coupled to the load and configured to provide feedback representative of the DC output voltage; and
   a controller circuit coupled to the reconfigurable resonant tank circuit and configured to place the switch in the first state or the second state in response to the feedback,
   wherein the controller circuit is configured to provide a switching control output to the switching circuit to control a frequency of the AC output voltage to be 120 kHz or less in both a first resonant tank configuration and a second resonant tank configuration.

11. The resonant tank converter according to claim 10, wherein the controller circuit comprises a secondary controller configured to receive the feedback from the feedback circuit, an optocoupler, and a primary controller configured to receive an output of the secondary controller through the optocoupler, and wherein the primary controller is configured to provide a configuration control output to the switch to place the switch in the first state or the second state in response to the feedback.

12. The resonant tank converter according to claim 10, wherein the controller circuit is configured to provide a switching control output to the switching circuit to control a frequency of the AC output voltage.

13. A method of driving a load using a resonant converter, the method comprising:
   providing feedback representative of a DC output voltage to the load;
   controlling a switch of a reconfigurable resonant tank circuit of the resonant converter to place the switch in a first state or a second state in response to the feedback, wherein when the switch is in the first state the reconfigurable resonant tank circuit has a first resonant tank configuration and when the switch is in the second state the reconfigurable resonant tank circuit has a second resonant tank configuration; and
   controlling a frequency of an AC output voltage signal coupled to the reconfigurable resonant tank circuit to be 120 kHz or less in both the first resonant tank configuration and the second resonant tank configuration.

14. The method according to claim 13, wherein the first resonant tank configuration is an LLC resonant tank configuration, and the second resonant tank configuration is an LCC resonant tank configuration.

15. The method according to claim 13, wherein the reconfigurable resonant tank circuit comprises a capacitor coupled in series with the switch.

16. The method according to claim 13, wherein the switch is a metal oxide field effect transistor (MOSFET).

17. The method according to claim 13, wherein the controlling comprises switching the switch to the first state or the second state when the DC output voltage or an output current crosses a pre-determined threshold.

* * * * *